United States Patent [19]

Kishino et al.

[11] 3,829,565
[45] Aug. 13, 1974

[54] COMBATING INSECTS, ACARIDS AND NEMATODES USING S,S-DI(2-ALKOXY-ETHYL)PHOSPHORO- OR PHOSPHONOTHIONOTHIOLATES

[75] Inventors: Shigeo Kishino; Akio Kudamatsu; Kozo Shiokawa, all of Tokyo, Japan

[73] Assignee: Bayer Aktiengesellschaft, Leverkusen, Germany

[22] Filed: Jan. 26, 1973

[21] Appl. No.: 326,620

Related U.S. Application Data

[62] Division of Ser. No. 178,488, Sept. 7, 1971, now U.S. Patent No. 3,755,508.

[52] U.S. Cl.................................. 424/217, 260/950
[51] Int. Cl.............................................. A01n 9/36
[58] Field of Search..................................... 424/217

[56] References Cited
UNITED STATES PATENTS 3,229,001  1/1966  Schrader............................ 424/217
3,733,379  5/1973  Szabo................................. 424/217

*Primary Examiner*—Vincent D. Turner
*Attorney, Agent, or Firm*—Burgess, Dinklage & Sprung

[57] ABSTRACT

S,S-di (2-alkoxy-ethyl) phosphoro-or phosphonothionodithiolates of the general formula

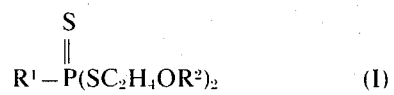

wherein
R$^1$ is a lower alkyl or lower alkoxy radical, and
R$^2$ is a lower alkyl radical, which possess insecticidal, acaricidal and nematocidal properties.

10 Claims, No Drawings

COMBATING INSECTS, ACARIDS AND NEMATODES USING S,S-DI(2-ALKOXY-ETHYL)PHOSPHORO-OR PHOSPHONOTHIONOTHIOLATES

This is a division, of application Ser. No. 178,488 filed Sept. 7, 1971, now Pat. No. 3,755,508.

The present invention relates to and has for its objects the provision of particular new S,S-di(2-alkoxyethyl) phosphoro- or phosphono- thionodithiolates, i.e. O-alkyl-S,S-di(2-alkoxy-ethyl) phosphoro-thionodithiolates and their alkylphosphono- analogues, which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g. insects, acarids and nematodes, with other and further objects becoming apparent from a study of the within specification and accompanying examples.

From the specification of Dutch Pat. No. 67,17383 it is known that the compound of the formula:-

$$C_2H_5O-\overset{O}{\underset{\|}{P}}(SC_2H_4SC_2H_5)_2 \qquad (A)$$

has insecticidal and fungicidal activity.

It has now been found that organic phosphoric acid esters of the formula (I) have excellent biological activity and are superior to the compound of formula (A) and other compounds having similar activity.

The invention also provides a process for the production of a compound of formula (I) in which (a) a phosphoric or phosphonic acid halide of the general formula:

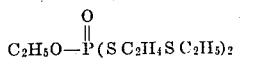

$$R^1-\overset{S}{\underset{\|}{P}}Cl_2 \qquad (II)$$

is reacted with a mercaptan of the general formula:

$$MSC_2H_4OR^2 \qquad (III)$$

or (b) a phosphorous or phosphinic acid halide of the general formula:

$$R^1-PCl_2 \qquad (IV)$$

is reacted with a mercaptan of the general formula (III), and the product is reacted with sulfur; in formulae (II), (III) and (IV) $R^1$ and $R^2$ have the same meanings as above, and M is hydrogen or a metal, e.g. an alkali metal such as sodium or potassium.

Process variant (a) is illustrated by the following reaction scheme:

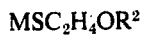
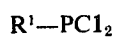

$$R^1-\overset{S}{\underset{\|}{P}}Cl_2 + 2MSC_2H_4OR^2 \longrightarrow$$
$$(II) \qquad (III)$$

$$R^1-\overset{S}{\underset{\|}{P}}(SC_2H_4OR^2)_2 + 2MCl$$
$$(I) \qquad (V)$$

Specific examples of $R^1$ in the various formulae above are methyl, ethyl, n-propyl, iso-propyl, n-butyl, iso-butyl, sec-butyl and tert-butyl radicals, and methoxy, ethoxy, n-propoxy, iso-propoxy, n-butoxy, iso-butoxy, sec-butoxy and tert-butoxy radicals. Examples of $R^2$ are the lower alkyl groups just mentioned in respect of $R^1$.

Examples of the thionophosphoric and -phosphonic acid dichlorides of formula (II) include O-methylthionophosphoric acid dichloride, O-ethylthionophosphoric acid dichloride, O-n-propylthionophosphoric acid dichloride and ethylthionophosphonic acid dichloride.

Examples of the 2-alkoxyethylmercaptans of formula (III) include 2-methoxyethylmercaptan, 2-ethoxyethylmercaptan, 2-n—pro-poxyethylmercaptan, 2-iso-propoxyethylmescaptan, and 2-n—butoxyethylmercaptan. Sodium or potassium salts of these mercaptans may be used.

Process variant (b) is illustrated by the following reaction scheme:

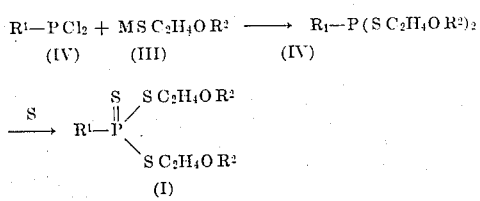

$$R^1-PCl_2 + MSC_2H_4OR^2 \longrightarrow R_1-P(SC_2H_4OR^2)_2$$
$$(IV) \qquad (III) \qquad (IV)$$

$$\overset{S}{\longrightarrow} R^1-\overset{S}{\underset{\|}{P}}\diagup\overset{SC_2H_4OR^2}{\diagdown_{SC_2H_4OR^2}}$$
$$(I)$$

Examples of the phosphorous and phosphonous acid dichlorides formula (IV) include O-methylphosphorous acid dichloride, O-ethylphosphorous acid dichloride, O-n-propylphosphorous acid dichloride and ethylphosphonous acid dichloride.

In both process variants it is preferred that the reaction be conducted in a solvent, which term includes a mere diluent. As the solvent there may be cited water; aliphatic, and aromatic hydrocarbons which may be halogenated, such as hexane, cyclohexane, petroleum ether, ligroin, benzene, toluene, xylene, methylene chloride, chloroform, carbon tetrachloride, mono-, di- and trichloroethylenes, and chlorobenzene; ethers such as diethyl ether, methyl ethyl ether, iso-propyl ether, dibutyl ether, ethylene oxide, dioxane and tetrahydrofurane; ketones such as acetone, methyl ethyl ketone, methyl isobutyl ketone and methyl isopropyl ketone; nitriles such as acetonitrile, propionitrile and acrylonitrile; alcohols such as methanol, ethanol, isopropanol, butanol and ethylene glycol; esters such as ethyl acetate and amyl acetate; acid amides such as dimethyl formamide and dimethyl acetamide; and sulfoxides and sulfones such as dimethyl sulfoxide and sulfolane.

The reaction may be conducted in the presence of an acid binder. For this purpose, there may be used customary acid binders such as hydroxides. carbonates, bicarbonates and alcoholates of alkali metals, and tertiary amines such as triethylamine, diethylaniline and pyridine.

The reaction may be effected at temperatures over a very broad range, but generally the reaction is carried out at from about −20°C to the boiling point of the reaction mixture, preferable temperatures being in the range from about −10 to 100°C.

It is preferable that the reaction be conducted under atmospheric pressure but it is possible to conduct the reaction under reduced or elevated pressures.

The active compounds of this invention exhibit excellent biological activity against various harmful insects, nematodes and mites. As compared with active compounds of similar structures which have been known from references or known compounds exhibiting similar activities, the active compounds of this invention are characterized in that they exhibit substantially improved effects have very low toxicity to warm-blooded animals and do not harm plants. Furthermore, they exhibit their activities quickly and over a long period of time. Accordingly, they are of great utility and can be used for controlling harmful insects of a broad range such as sucking insects, biting insects, mites and nematodes.

For instance, the active compounds of this invention are effective for controlling harmful insects such as insects belonging to Coleoptera, e.g., small rice weevil (*Sitophilus oryzae*), rust-red flour beetle (*Tribolium castaneum*), 28- spotted lady beetle (*Epilachna vigintioctopunctata*), barley wireworm (*Agriotes fuscicollis*) and soy bean beetle (*Anomala rufocuprea*), insects belonging to Lepidoptera, e.g. gypsy moth (*Lymantria dispar*), tent caterpillar (*Malacosoma neustria testacea*), common cabbageworm (*Pieris rapae crucivora*), tobacco cutworm (*Prodenia litura*), rice stem borer (*Chilo suppressalis*), smaller tea tortrix (*Adoxophyes orana*) and almond moth (*Ephestia cautella*), insects belonging to Hemiptera, e.g., green rice leaf hopper (*Nephotettix cincticeps*), brown planthopper (*Nilaparvata lugens*), comstock mealybug (*Pseudococcus comstocki*), arrowhead scale (Unaspis yanonensis), green peach aphid (Myzus persicae), apple aphid (Aphis pomi) and cabbage aphid (Brevicoryne brassicae), insects belonging to Orthoptera, e.g., German cockroach (*Blattella germanica*), American cockroach (*Periplaneta americana*) and African mole cricket (*Gryllotalpa africana*), insects belonging to Isoptera, e.g., Japanese termite (*Leucotermes speratus*), and insects belonging to Diptera, e.g., muscid (*musca domestica vicina*), yellow-fever mosquito (*Aedes aegypti*), seed-corn maggot (*Hylemia platura*), pale house mosquito (*Culex pipiens*), Chinese malaria mosquito (*Anopheles sinensis*) and smaller house mosquito (*Culex tritaeniorhynchus*); mites such as carmine mite (*Tetranychus telarius*), citrus red mite (*Panonychus citri*) and Japanese citrus rust mite (*Aculus pelekassi*); and nematodes such as southern root-knot nematode (*Meloidogyne incognita*), rice white-tip nematode (*Aphelenchides besseyi*) and soy bean cyst nematode (*Heterodera glycines*); and the like.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, (e.g. conventional pesticide dispersible carrier vehicles, such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose; aerosol propellants which are gaseous at normal temperatures and pressures, such as freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g., acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Other diluents and carriers include stabilizers; spreaders (stickers) such as agricultural soaps, casein lime, sodium alginate, polyvinyl alcohol (PVA), soapless soap, coumarone or indene resins and polyvinyl butyl ether; combustive agents for fumigating such as nitrous acid salts, zinc powder and dicyano diamide; oxygen-yielding agents such as perchloric acid salts and dichlomic acid salts; phytotoxicity-reducing agents such as zinc sulfate, ferrous chloride and copper nitrate; effect-prolonging agents such as terphenyl chloride, dispersion stabilizers such as casein, tragacanth, carboxymethyl cellulose (CMC) and polyvinyl alcohol (PVC); and promoters.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, bactericides and nematocides, or rodenticides, herbicides, fertilizers, growth-regulating agents, etc., and attractants (for instance organic phosphoric acid esters, carbamate compounds, dithio or thiol carbamate compounds, organic chlorine compounds, dinitro compounds, organosulfur or organometallic compounds, antibiotic compounds, substituted diphenyl ethers, urea compounds and triazine compounds), if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–20 percent, preferably 0.005–10 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.005–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 3 to 1000 g/10 ares, preferably 30 to 600 g/10 ares, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects, acarids and nematodes and more particularly methods of combating at least one of insects, acarids and nematodes which comprises applying to at least one of correspondingly (a) such insects, (b) such acarids, (c) such nematodes and (d) the corresponding habitat thereof, i.e. the locus to be protected, a correspondingly combative or toxic amount, i.e. an insecticidally, acaricidally or nematocidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

22 g of 2-ethoxyethylmercaptan were added to 150 ml of toluene containing 4.6 g of metallic sodium and the mixture was heated to dissolve the sodium. While the solution was maintained at 0–10°C, 16.5 g of o-methyl-thionophosphoric acid dichloride were added dropwise.

After completion of the addition, the temperature was gradually elevated, and the reaction was affected at 80°C for 3 hours.

The reaction mixture was cooled, washed with water and 1 percent aqueous solution of potassium carbonate and dried over anhydrous sodium sulfate. Distillation of toluene gave 26 g of colorless, oily O-methyl-S,S-di(2-ethoxyethyl) phosphorothionodithiolate of the formula:

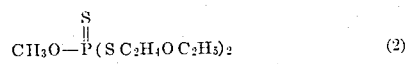

The product is characterized by a boiling point of 130–134°C under 0.04 mm Hg and a refractive index $n^{20}_D$ of 1.5450.

EXAMPLE 2

22 g of 2-ethoxyethylmercaptan were added to 150 ml of toluene containing 4.6 g of sodium metal, and the mixture was heated to dissolve the sodium. While the solution was being maintained at 0–10°C, 16.3 g of ethylthionophosphonic acid dichloride were added dropwise thereto. After completion of the addition, the temperature was elevated gradually, and the reaction was effected at about 80°C for 4 hours.

The reaction mixture was washed with water and 1 percent aqueous solution of potassium carbonate. Distillation of toluene gave 26 g of colorless, oily ethyl-S,S-di(2-ethoxyethyl) phosphonothiolate of the formula:

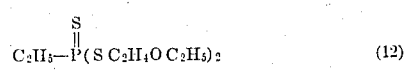

The product is characterized by a boiling point of 145–148°C at 0.15 mm Hg and a refractive index $n_D^{20}$ of 1.5522.

EXAMPLE 3

15 g of O-ethylphosphorous acid dichloride were dissolved in 150 ml of toluene and the solution was cooled below 0°C. A mixture of 22.5 g of 2-ethoxyethylmercaptan, 17 g of pyridine and 40 ml of toluene was added dropwise to the cooled solution while nitrogen gas was blown thereinto. Adjustments were made so as to maintain the temperature of the reaction mixture below 0°C during the addition. After completion of the addition, the temperature was gradually elevated, and the mixture was agitated for an hour at room temperature and for another hour at 40–50°C to complete the first stage reaction. Then 3.2 g of sulfur were added to the reaction mixture and it was heated at 80°C for an hour. Then the reaction mixture was cooled, washed with water and 1 percent aqueous solution of potassium carbonate and dried over anhydrous sodium sulfate. Distillation of toluene gave 28 g of colorless, oily O-ethyl-S,S-di(2-ethoxyethyl)phosphorothionodithiolate of the formula:

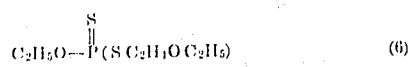

The product is characterized by a boiling point of 135–138°C under 0.05 mm Hg and a refractive index $n_D^{20}$ of 1.5345.

These and other compounds synthesized by methods analogous to those of Examples 1–3 are listed in Table 1.

TABLE 1

| Compound number | Structural formula | Physical properties |
|---|---|---|
| (1) | $CH_3O-\overset{S}{\overset{\|}{P}}(S\ C_2H_4O\ CH_3)_2$ | $n_D^{20}\ 1.5591$ |
| (2) | $CH_3O-\overset{S}{\overset{\|}{P}}(S\ C_2H_4O\ C_2H_5)_2$ | B.P. 130–134° C./ 0.04 mm. Hg, $n_D^{20}\ 1.5450$ |
| (3) | $CH_3O-\overset{S}{\overset{\|}{P}}(S\ C_2H_4O\ C_3H_7\text{-iso})_2$ | $n_D^{20}\ 1.5249$ |
| (4) | $CH_3O-\overset{S}{\overset{\|}{P}}(S\ C_2H_4O\ C_4H_9\text{-n})_2$ | $n_D^{20}\ 1.5233$ |
| (5) | $C_2H_5O-\overset{S}{\overset{\|}{P}}(S\ C_2H_4O\ CH_3)_2$ | B.P. 134–137° C./ 0.05 mm. Hg, $n_D^{20}\ 1.5470$ |
| (6) | $C_2H_5O-\overset{S}{\overset{\|}{P}}(S\ C_2H_4O\ C_2H_5)_2$ | B.P. 135–138° C./ 0.05 mm. Hg, $n_D^{20}\ 1.5345$ |
| (7) | $C_2H_5O-\overset{S}{\overset{\|}{P}}(S\ C_2H_4O\ C_3H_7\text{-n})_2$ | B.P. 146–150° C./ 0.1 mm. Hg, $n_D^{20}\ 1.5217$ |
| (8) | $C_2H_5O-\overset{S}{\overset{\|}{P}}(S\ C_2H_4O\ C_3H_7\text{-iso})_2$ | B.P. 140–145° C./ 0.08 mm. Hg, $n_D^{20}\ 1.5201$ |
| (9) | $C_2H_5O-\overset{S}{\overset{\|}{P}}(S\ C_2H_4O\ C_4H_9\text{-n})_2$ | B.P. 141–146° C./ 0.03 mm. Hg, $n_D^{20}\ 1.5174$ |
| (10) | $\text{n-}C_3H_7O-\overset{S}{\overset{\|}{P}}(S\ C_2H_4O\ C_2H_5)_2$ | B.P. 150–153° C./ 0.1 mm. Hg, $n_D^{20}\ 1.5229$ |
| (11) | $C_2H_5-\overset{S}{\overset{\|}{P}}(S\ C_2H_4O\ CH_3)_2$ | B.P. 130–133° C./ 0.1 mm. Hg, $n_D^{20}\ 1.5641$ |
| (12) | $C_2H_5-\overset{S}{\overset{\|}{P}}(S\ C_2H_4O\ C_2H_5)_2$ | B.P. 145–148° C./ 0.15 mm. Hg, $n_D^{20}\ 1.5522$ |

The use and activity of the novel compounds is illustrated by the following examples wherein all parts are by weight.

EXAMPLE 4 (WETTABLE POWDER)

15 parts of compound (2), 80 parts of a 1:5 mixture of diatomaceous earth and kaolin and 5 parts of an emulsifier ("RUNNOX," polyoxyethylene alkyl aryl ether) were ground and mixed together to form a wettable powder. It was diluted with water to a concentration of 0.05 percent and applied to harmful insects and their habitat.

EXAMPLE 5 (EMULSIFIABLE LIQUOR)

30 parts of compound (6), 30 parts of xylene, 30 parts of "KAWAKAZOL" (high boiling aromatic hydrocarbon), and 10 parts of an emulsifier "SORPOL" (polyoxyethylene alkyl aryl ether) were mixed with stirring to form an emulsifiable liquor. It was diluted with water to 0.05 percent and sprayed on harmful insects and their habitat.

EXAMPLE 6 (DUST)

2 parts of compound (10) and 98 parts of a 1:3 mixture of talc and clay were ground and mixed together to form a dust. They were applied on harmful insects and their habitat.

EXAMPLE 7 (DUST)

1.5 parts of compound (5), 2 parts of an organic phosphoric acid ester, 0.5 parts of iso-propyl hydrogen phosphate (PAP) and 96 parts of a 1:3 mixture of talc and clay were ground and mixed together to form a dust. They were applied on harmful insects and their habitat. (*fenthion)

EXAMPLE 8 (GRANULES)

25 parts of water were added to a mixture of 10 parts of compound (12), 10 parts of bentonite, 78 parts of a 1:3 mixture of talc and clay and 2 parts of lignin sulfonate. The admixture was intimately blended and finely divided by means of an extruding granulator to obtain granules of 20–40 mesh, followed by drying at 40–50°C. The resulting granules were applied on harmful insects and their habitat (to soil).

EXAMPLE 9 (GRANULES)

95 parts of clay particles of a size distribution of 0.2–2 mm were taken into a rotary mixer and a solution of 5 parts of compound (8) in an organic solvent was sprayed on to the particles being rotated, thereby wetting the particles homogeneously. Then they were dried at 40–50°C to form coated granules. They were scattered on harmful insects and their habitat (applied to soil).

EXAMPLE 10 (OIL PREPARATION)

0.5 part of compound (10), 20 parts of Bersicoal AR-50 (high boiling aromatic hydrocarbon), and 79.5 parts of Deobase (deodorized kerosene) were mixed with stirring to form an oil preparation. It was sprayed on harmful insects and their habitat.

The unexpectedly excellent effects and advantages of the compounds of this invention are illustrated by the results of tests on effects against various harmful insects, mites and nematodes given below.

EXAMPLE 11

Test of effects against tobacco cutworm larvae:
Preparation of Sample Chemicals:
 Solvent: 3 parts by weight of dimethyl formamide
 Emulsifier: 0.1 part by weight of alkylaryl polyglycol ether In order to prepare a suitable formulation of the active compound, one part by weight of the active compound is mixed with the above amount of the solvent containing the above amount of the emulsifier, and the mixture is diluted with water to form an aqueous dilution containing the active compound at a prescribed concentration.

Test Procedures

Sweet potato leaves are dipped in a dilution of an emulsifiable liquor containing the compound of this invention at the prescribed concentration, and they are dried in the air and placed into a 9 cm diameter Petri dish. Then 10 third-instar tobacco cutworm (Prodenia litura) larvae are put into the dish and the dish is kept in a thermostat chamber maintained at 28°C. After 24 hours have passed, the number of dead worms is counted and the killing ratio is calculated. Results are shown in Table 2.

Table 2

| Active Ingredient Compound No. | Killing Ratio Concentration | | |
|---|---|---|---|
| | 1000 ppm | 300 ppm | 100 ppm |
| (1) | 100 | 100 | 70 |
| (2) | 100 | 100 | 80 |
| (3) | 100 | 100 | 60 |
| (4) | 100 | 100 | 50 |
| (5) | 100 | 100 | 100 |
| (6) | 100 | 100 | 100 |
| (7) | 100 | 100 | 100 |
| (8) | 100 | 100 | 100 |
| (9) | 100 | 100 | 60 |
| (10) | 100 | 100 | 50 |
| (11) | 100 | 100 | 60 |
| (12) | 100 | 100 | 70 |
| Sumithion (commercially available comparison) | 100 | 100 | 20 |

Note: Sumithion: O,O-dimethyl-O-(3-methyl-4-nitrophenyl) phosphorothioate.

EXAMPLE 12

Test of effects against German cockroach (Blatella germanica)

Test Procedures

A sheet of filter paper is spread in a Petri dish of 9 cm diameter and 1 ml of an aqueous diluted liquor containing the active compound at the determined concentration and prepared in the same manner as in Example 11 is poured into the dish. Then 10 female German cockroach imagines are put into the dish and the dish is kept for 24 hours in a thermostat chamber maintained at 28°C. The number of dead worms is counted and the killing ratio is calculated. The results are shown in Table 3.

Table 3

| Active ingredient concentration Compound No. | Killing Ratio (%) | |
|---|---|---|
| | 0.1% | 0.01% |
| (1) | 100 | |
| (2) | 100 | 80 |
| (3) | 100 | |
| (5) | 100 | 80 |
| (6) | 100 | 100 |
| (8) | 100 | 70 |
| (9) | 100 | 30 |
| (11) | 100 | 100 |
| (12) | 100 | 100 |

EXAMPLE 13

Tests of effects against muscid (Musca domestica vicina):

Test Procedures

A sheet of filter paper is spread in a Petri dish of 9 cm diameter and 1 ml of an aqueous dilution containing the active compound at the determined concentration and prepared in the same manner as in Example 11 is poured into the dish. Then 10 female muscid imagines are put into the dish and the dish is kept for 24 hours in a thermostat chamber maintained at 28°C. The number of dead worms is counted and the killing ratio is calculated. The results are shown in Table 4.

Table 4

| Active ingredient concentration Compound No. | Killing Ratio (%) | |
|---|---|---|
| | 1000 ppm | 100 ppm |
| (1) | 100 | 30 |
| (2) | 100 | 80 |
| (3) | 100 | 80 |
| (5) | 100 | 70 |
| (6) | 100 | 90 |
| (8) | 100 | 100 |
| (9) | 100 | 80 |
| (10) | 100 | 50 |
| (11) | 100 | 80 |
| (12) | 100 | 100 |

EXAMPLE 14

Test of effects against two-spotted spider mites Tetranychus telarius):

Test Procedures

Haricot having two developing leaves planted in a 6 cm diameter pot is infected with 50–100 imagines and nymphs of the carmine mite. Two days after the infection, an aqueous dilution of an emulsifiable liquor containing the active compound at a prescribed concentration, which is prepared in the same manner as in Example 11, is sprayed in an amount of 40 ml per pot. The pot is kept in a greenhouse for 10 days and the control effect is evaluated. The evaluation is expressed by the index rated on the following scale:

Index

3: No living imago or nymph.

2: less than 5 percent living imagines and nymphs based on the untreated control 1: 5–50 percent of living imagines and nymphs based on the untreated control 0: more than 50 percent of living imagines and nymphs based on the untreated control. The results are shown in Table 5.

Table 5

| Compound No. | Control effect index | |
|---|---|---|
| | 300 ppm | 100 ppm |
| (1) | 3 | 1 |
| (2) | 3 | 2 |
| (3) | 3 | 2 |
| (4) | 3 | 1 |
| (5) | 3 | 1 |
| (6) | 3 | 1 |
| (7) | 3 | 2 |
| (8) | 3 | 1 |
| (9) | 3 | 3 |
| (10) | 3 | 2 |
| (11) | 3 | 3 |
| (12) | 3 | 3 |
| CMP (commercially available comparison) | 3 | 1 |
| Galecron (commercially available comparison) | 2 | 0 |

Note: Galecron: N'-(2-methyl-4-chlorophenyl)-N,N-dimethyl formamizine hydrochloride
CMP: O,O-diethyl-S-(2,5-dichlorophenyl-mercaptomethyl) dithiophosphate

EXAMPLE 15

Test of effects against root knot nematode (Meloidogyne icognite acrita):

Preparation of Sample Chemical 2 parts by weight of the active compound is mixed with 98 parts by weight of talc, and the mixture is ground to form dusts.

Test Procedures

The thus prepared chemical is mixed with a soil infected with sweet potato root knot nematode in an amount such that a prescribed concentration of the active compound is attained in the soil. The chemical-mixed soil is uniformly stirred, and then it is packed in a pot having an area of 1/5000 are. Then about 20 seeds of tomato (Kurihara variety) are sowed per pot and cultivated for 4 weeks in a greenhouse. Then each root is drawn out from the soil without hurting it. The damage degree is evaluated with respect to 10 roots as one group based on the following scale.

Damage Degree (rank value)
- 0 ... no knot (perfect control)
- 1 ... knots are formed slightly
- 2 ... knots are formed to a moderate extent
- 3 ... knots are formed considerably
- 4 ... formation of knots is extreme (same as in untreated control).

The knot index is determined by the following equation:

$$\text{Knot Index} = \frac{\Sigma(\text{rank value}) \times (\text{rank population}^*)}{(\text{whole roots examined}) \times 4} \times 001$$

*number of damaged roots in each degree.

The results are shown in Table 6.

Table 6

| Compound No. | Active ingredient concentration (ppm) | Root knot index (%) |
|---|---|---|
| (2) | 30 | 0.5 |
|  | 10 | 3.2 |
| (6) | 30 | 1.1 |
|  | 10 | 6.4 |
| VC | 30 | 0.8 |
| (commercially available comparison) | 15 | 25.0 |

Note: VC: O,O-diethyl-O-(2,4-dichlorophenyl) thiophosphate.

This test was carried out in the same manner as "Phytopathology" Vol. 37, p 85, 1947.

It will be appreciated that the instant specification and examples are set forth by way of illustration and not limitation and that various modifications and changes may be made without departing from the spirit and scope of the present invention.

What is claimed is:

1. An insecticidal, acaricidal or nematocidal composition comprising an insecticidally, acaricidally or nematocidally effective amount of an ester of the formula

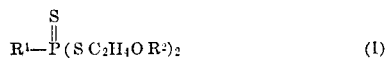

wherein
$R^1$ is lower alkyl or lower alkoxy, and
$R^2$ is lower alkyl, in admixture with a diluent.

2. The composition according to claim 1, wherein such ester is
O-methyl-S,S-di(2-ethoxyethyl) phosphorothionodithiolate,
O-ethyl-S,S-di(2-methoxyethyl) phosphorothionodithiolate,
O-ethyl-S,S-di(2-ethoxyethyl) phosphorothionodithiolate,
O-ethyl-S,S-di(2-isopropoxyethyl) phosphorothionodithiolate,
ethyl-S,S-di(2-methoxyethyl) phosphonothionodithiolate, or
ethyl-S,S-di(2-ethoxyethyl) phosphonothionodithiolate.

3. A method of combating insect, acarid or nematode pests which comprises applying to the pests or a habitat thereof an insecticidally, acaricidally or nematocidally effective amount of an ester of the formula

wherein
$R^1$ is lower alkyl or lower alkoxy, and
$R^2$ is lower alkyl.

4. The method according to claim 3 wherein
$R^1$ is alkyl or alkoxy of one to four carbon atoms, and
$R^2$ is alkyl of one to four carbon atoms.

5. The method according to claim 3 wherein such ester is O-methyl-S,S-di(2-ethoxyethyl) phosphorothionodithiolate of the formula:

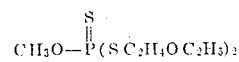

6. The method according to claim 3 wherein such ester is O-ethyl-S,S-di(2-methoxyethyl) phosphorothionodithiolate of the formula:

7. The method according to calim 3 wherein such ester is
O-ethyl-S,S-di(2-ethoxyethyl) phosphorothionodithiolate of the formula:

8. The method according to claim 3 wherein such ester is
O-ethyl-S,S-di(2-isopropoxyethyl) phosphorothionodithiolate of the formula:

9. The method according to claim 3 wherein such ester is
ethyl-S,S-di(2-methoxyethyl) phosphonothionodithiolate of the formula:

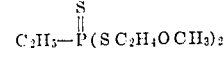

10. The method according to claim 3 wherein such ester is ethyl-S,S-di(2-ethoxyethyl) phosphonothionodithiolate of the formula:

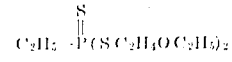

* * * * *

UNITED STATES PATENT OFFICE
CERTIFICATE OF CORRECTION

Patent No. 3,829,565  Dated August 13, 1974

Inventor(s) SHIGEO KISHINO ET AL

It is certified that error appears in the above-identified patent and that said Letters Patent are hereby corrected as shown below:

Col. 1, after item [62] "Related U.S. Application Data"

"Division of..........3,755,508." insert

-- Claims Priority - Japanese Application Serial No. SHO 45-78493, filed September 9, 1970.--

Col. 11, line 27, cancel "001" and substitute -- 100 --.

Claim 7, line 1, (col. 12), correct spelling of "claim".

Signed and sealed this 24th day of December 1974.

(SEAL)
Attest:

McCOY M. GIBSON JR.
Attesting Officer

C. MARSHALL DANN
Commissioner of Patents